June 17, 1941.  J. O. ALMEN  2,246,232

VIBRATION SUPPRESSOR

Filed Nov. 4, 1940

Inventor
John O. Almen
By
Blackmore, Spencer & Blink
Attorneys

Patented June 17, 1941

2,246,232

UNITED STATES PATENT OFFICE 2,246,232

VIBRATION SUPPRESSOR

John O. Almen, Royal Oak, Mich., assignor to General Motors Corporation, Detroit, Mich., a corporation of Delaware Application November 4, 1940, Serial No. 364,146

9 Claims. (Cl. 74—574)

This invention relates to devices for suppressing vibrations occurring in shafts.

The object is to improve and simplify vibration suppressing devices of the type comprising an inertia body coaxial with a shaft subject to torsional or other vibration and driven by said shaft through elastic means adapted to cause the body to rotate at the mean speed of the shaft and to restore it to mean position with respect to the shaft after the elastic means has been distorted.

The invention consists of a relatively heavy annular body in combination with a radially corrugated disk spring, to the peripheral portion of which the annular body is attached, and means for securing the central portion of the spring firmly to a shaft. It includes, more specifically, means for attaching the annular body to the spring consisting of radial inward projecting lugs engaging within the outer ends of the grooves upon opposite faces of the disk; also a clamping means for securing the central portion of the disk rigidly to a shaft comprising a fitting having a serrated face engaging the corrugations around a central hole that is provided in the disk, said fitting constituting one element of a clamp; a companion clamping element having corresponding serrations for engaging the corrugations on the other face of the disk, and a device for forcing said clamping elements toward each other and fixing the elements adjustably in the desired relations for proper tuning of the device. It also includes means for affording frictional damping between shaft and annular body consisting of a flange-like member fixed to the shaft near the disk springs and body, the outer zone of the flange-like member bearing against the adjacent side of the body, whereby relative angular movement between body and flange-like member will be restrained. It also includes further details of structure as fully set forth in the ensuing description.

In the accompanying drawing.

Figure 1:
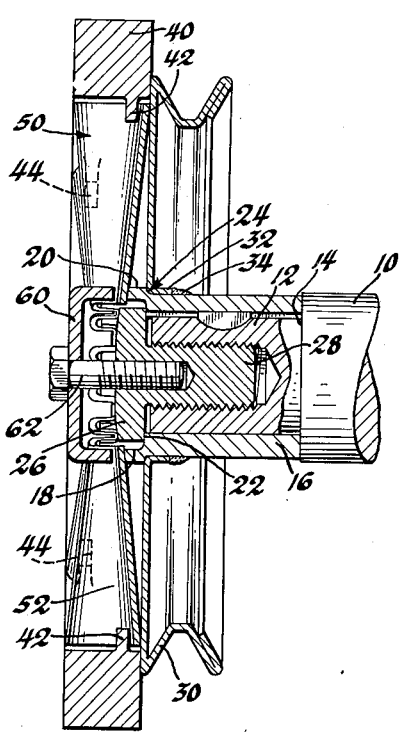
Fig. 1 is a sectional view of the invention taken on line 1—1 of Fig. 2.
Figure 2:
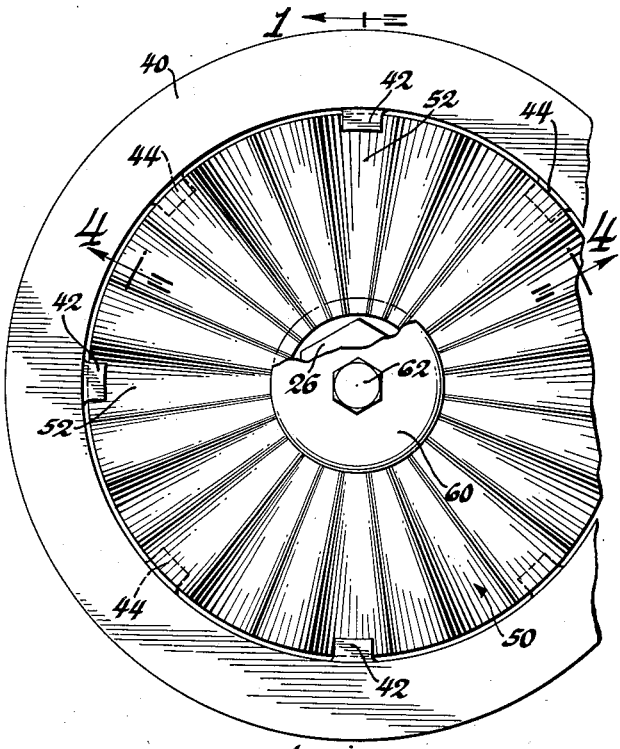
Fig. 2 is an end elevation viewed from a point at the left of Fig. 1.

In Fig. 1 numeral 10 indicates a shaft such as the crankshaft of an automobile engine the front end 12 of which is reduced in diameter providing a shoulder 14. A tubular fitting 16 surrounds and is keyed to the reduced front end 12 of the shaft. The rear end of the fitting abuts against the shoulder 14; the front end is counterbored at 18, and enlarged in external diameter around the counterbore as at 20. Thus are provided an internal shoulder 22 formed by the counterbore, and also an external oppositely facing shoulder 24 formed by the front end enlargement 20. Engaging the internal shoulder 22 is the head 26 of a threaded bolt 28 screwed into a central threaded bore in the end of the reduced part 12 of shaft 10. Bolt 28 thus holds the fitting 16 against the shoulder 14. A disk or flange-like member shown as a belt pulley 30 is secured to the fitting 16 by any suitable means. The pulley is shown with a hub-like tubular sleeve 32 projecting rearward and snugly surrounding the fitting 16 to which it is secured, as by welding as indicated at 34, with the forward face of the pulley seated against the external shoulder 24 of the fitting. The front end of said fitting functions as a circular clamp member having a crown of forward projecting teeth 36 (Fig. 3) separated by spaces having curved throats for a purpose to be explained.

Numeral 40 indicates an annular relatively heavy inertia body in the nature of a fly-wheel rim connected solely to the shelf 10 by means of elements to be described. The inertia body 40 is provided on its interior surface with two rows of inward projecting lugs, one row in the example illustrated consisting of four lugs 42 lying substantially in one plane normal to the axis near the rear of the body 40, and the other row consisting of four lugs 44 lying substantially in another plane parallel with the first near the front of body 40. The lugs 42 are spaced 90° from each other, and the lugs 44 are also spaced 90° from each other, but lugs 42 are spaced angularly 45° from lugs 44; the lugs therefore are in staggered relation as shown clearly in Fig. 4. The lugs 42 and 44 may be integral with the annular body or attached thereto in any suitable manner.

Figure 4:
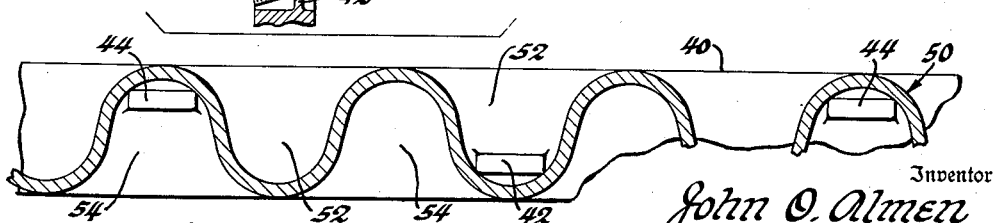
Fig. 4 is a section along the curved line 4—4 of Fig. 2 appearing as if viewed in the direction indicated by the arrows.

Numeral 50 indicates a corrugated disk spring the corrugations radiating from the center to the rim. The spring has a central hole that is preferably of greater diameter than the head 26 of bolt 28 in order to provide for a compact assembly. From the central hole in the spring the corrugations increase in height and width to the rim, since the corrugations are formed on radiating lines and are of progressively larger circumferential extent from the center hole to the outer rim. The spring in its unstressed condition is preferably a wide-angle conoidal member and becomes stressed by pressure tending to flatten it. The corrugations are composed of alternating tapering grooves and ridges correspondingly rounded in cross section as shown in Fig. 4. The grooves in the forward face of the spring are indicated by numeral 52 and those on the rearward face by numeral 54. When the spring disk is assembled with the heavy annulus 40 the lugs 42 extend into four of the grooves 52 on the forward face and the lugs 44 extend into four of the grooves 54 on the rearward face. Thus the outer portion of the spring and the annular body are mutually held from moving forward in an axial direction out of the space within the inner circumference of the annulus 40 by lugs 42, and from moving in the opposite direction with respect to the annulus by lugs 44.

Figure 3:
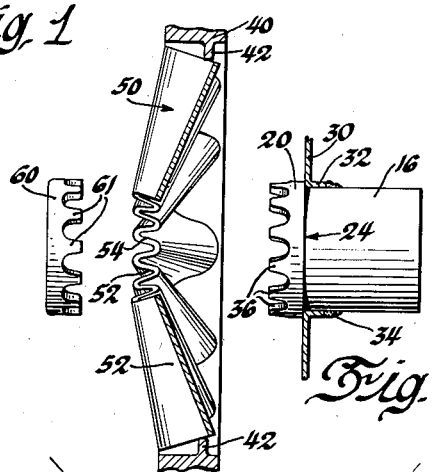
Fig. 3 is a view illustrating the annular mass and disk spring in position to be assembled, and also the axially separated elements of a serrated clamping device for securing the disk spring to the shaft.

The spring disk 50 may be assembled with annulus 40 by distorting it into the form of a cone of lesser angle than that of the spring when in equilibrium, then inserting the spring in position within the annulus, relaxing the distorting force and allowing the spring to resume its normal state with the lugs 42 and 44 entering the outer ends of the respective grooves 52 and 54. Fig. 3 shows the spring 50 distorted to admit of its being inserted past one series of lugs into the position illustrated. Any convenient fixture such as a suitable form of arbor press may be used to distort the spring so as to permit assemblage with the annulus 40.

A means reacting between shaft and spring for securing the spring to the shaft and varying its frequency comprises the elements now to the described.

A clamping element 60 is provided for cooperating with the opposing companion element on the front end of fixture 16. Element 60 is equipped with a crown of teeth 61 similar to teeth 36 on fixture 16. The teeth 61 are shaped to fit into the small ends of grooves 52 in the front face of spring 50, and the teeth 36 on fixture 16 fit into the small ends of grooves 54 in the rear face of said spring. Obviously, the teeth on one clamping element are opposite the spaces between the teeth in the other when intercalated with the inner ends of the corrugations on the spring. Thus, when the clamping elements are forced toward one another so that the teeth enter the corrugations they hold the central portion of the spring so that it cannot rotate nor move longitudinally with respect to the shaft. The clamping element 60 may be forced toward its companion element by a headed adjusting screw 62 the shank of which is passed through the central hole shown in element 60 and is threaded into an axial hole in bolt 28 as shown in Fig. 1. The adjusting screw 62 tends to increase the stress on the spring in proportion as it is screwed inward. By this means the vibration frequency of the spring may be varied and the spring tuned to the required frequency.

The spring 50 by reason of its radial corrugations is capable of yielding angularly so that the inner and outer portions may become relatively displaced, or the spring distorted circumferentially. If, therefore, the shaft oscillates torsionally the annular mass functioning as a flywheel tends to maintain a steady rotation while the inner portion of the disk spring oscillates with the shaft and tends to make the entire disk oscillate with the inner portion. The lugs 42 and 44 may slip a limited extent on the spring and create some friction, as the shaft vibrates, and the spring tends always to restore any relative displacement of the outer portion of the spring with respect to the shaft. As the pulley 30 is fixed to the shaft it oscillates with it. The friction between the pulley and the rearward face of annular mass 40 tends to damp the oscillations. The pressure between pulley and annular mass may be definitely established when the parts are assembled on the fitting 16. The pressure of the annular mass on the pulley may be regulated also by tightening the adjusting screw 62, thereby stiffening the spring and increasing its natural frequency of oscillation and also causing it to press the annulus 40 with increased force against the pulley 30. The parts in frictional engagement cannot creep relative to one another out of a range to which they are restricted by the spring. The torsional vibration suppressing action is due in part to the inertia of the mass 40, when the spring is tuned to the proper frequency, tending to restrain oscillations of the shaft by the opposing oscillations of the body and partly to frictional damping due to the rubbing of lugs 42 and 44 on the spring and the rubbing of disk 30 on the rear face of body 40. As the spring is susceptible of distortion by transverse or beam vibrations as well as by torsional vibrations it will be apparent that any vibratory tendency of the shaft to which this device may be attached will be restrained.

I claim:
1. Means for suppressing vibrations in a shaft comprising an annular inertia body, a disk spring having radial corrugations extending from the central portion to the outer circumference, means for attaching the annular body to the outer portion of the spring, and means for connecting the central portion of the spring rigidly to a shaft.

2. A combination as defined in claim 1 in which the means for attaching the annular body to the outer portion of the spring is a frictional connection adapted to allow a limited angular slippage between body and spring.

3. A combination as defined in claim 1 in which the means for attaching the annular body to the disk spring comprises two series of radial lugs projecting from the inner surface of the annular body toward the axis, alternate lugs engaging in the ends of grooves on opposite faces of said spring, respectively.

4. A combination as defined in claim 1 in which the means connecting the central portion of the spring rigidly to the shaft comprises a fitting adapted to be fixed to the shaft, said fitting having at one end an annular row of spaced teeth adapted to enter the grooves in the disk spring on one face adjacent to the center, a companion element having teeth adapted to enter the grooves on the other face of the disk spring near the center, and means to force the companion element axially toward the fitting.

5. In means for suppressing vibrations of a shaft, the combination of an annular inertia body, with a disk spring having radial corrugations and a central opening; means for attaching the annular body to the outer portion of the spring; means for connecting the central portion of the spring rigidly to the shaft, said means comprising a tubular fitting adapted to be keyed to the shaft, said fitting having at one end an annular row of teeth adapted to enter the grooves in the disk spring on one face adjacent the central opening; a companion element having a central hole and an annular row of teeth corresponding to those of the fitting and adapted to enter the grooves on the other face of the disk spring near the central opening, and means connecting the companion element to the shaft comprising a headed bolt inserted in the central hole of the element and screw connected with the shaft.

6. A combination as defined in claim 5 in which the tubular fitting is formed with an internal shoulder adjacent the annular row of teeth, a bolt having a head engaging said shoulder and a threaded shank adapted to be screwed into the end of the shaft for forcing the fitting against a shoulder on the shaft, said bolt having a threaded bore to receive the shank of the bolt that holds the companion clamping element in contact with the disk spring.

7. Means for suppressing vibrations in a shaft comprising an annular inertia body; a disk spring having radial corrugations extending from the central portion to the outer circumference; means for attaching the annular body to the outer portion of the spring; means for connecting the central portion of the spring rigidly with the shaft; a flange-like member rigid with the shaft and in frictional contact with said inertia body.

8. A combination as defined in claim 7 in which the disk spring is in the form of a wide angle cone, with adjustable means reacting between the shaft and the central part of the spring for forcing said central part toward the plane of said flange-like member, thereby stressing the spring.

9. Means for suppressing vibrations in a shaft comprising a conoidal disk spring having radial corrugations, an annular inertia body attached to the outer portion of the spring; means for securing the central portion of the spring to the shaft including means for varying the frequency of the spring by pressure tending to flatten it.

JOHN O. ALMEN.